United States Patent [19]
MacKenna

[11] Patent Number: 5,960,190
[45] Date of Patent: Sep. 28, 1999

[54] IN-CIRCUIT EMULATION SYSTEM WITH MINIMAL IMPACT ON TARGET ENVIRONMENT

[75] Inventor: Craig MacKenna, Los Gatos, Calif.

[73] Assignee: Zilog, Inc., Campbell, Calif.

[21] Appl. No.: 08/797,932

[22] Filed: Feb. 12, 1997

[51] Int. Cl.⁶ .................................................... G06F 9/455
[52] U.S. Cl. ........................................................ 395/500.49
[58] Field of Search .................................. 395/500, 527, 395/568, 734, 183.01, 183.04

[56] References Cited

U.S. PATENT DOCUMENTS

| | | | |
|---|---|---|---|
| 4,455,654 | 6/1984 | Bhaskar et al. | 395/183.04 |
| 4,486,827 | 12/1984 | Shima et al. | 395/734 |
| 4,554,630 | 11/1985 | Sargent et al. | 395/183.04 |
| 4,740,895 | 4/1988 | Sargent et al. | 395/183.01 |
| 5,325,512 | 6/1994 | Takahashi | 395/500 |

OTHER PUBLICATIONS

User's Manual, *Zilog Z8S180 Emulator*, complete manual, (1995).

*Primary Examiner*—Kevin J. Teska
*Assistant Examiner*—Dan Fiul
*Attorney, Agent, or Firm*—Majestic, Parson, Siebert & Hsue

[57] ABSTRACT

An ICE system for emulating a device includes an EPROM storing control code, at least one RAM storing user code and data, a processor alternatively executing the control code and user code, and memory map switch logic dynamically switching the memory address map of the processor between monitor and user state configurations so as to minimally impact the target environment by maximizing the available memory address space for the user code and data when the processor is executing the user code.

6 Claims, 10 Drawing Sheets

IN-CIRCUIT EMULATION SYSTEM WITH MINIMAL IMPACT ON TARGET ENVIRONMENT

FIELD OF THE INVENTION

This invention relates generally to in-circuit emulation (ICE) systems and in particular, to an ICE system having a single processor running both the system control and user codes.

BACKGROUND OF THE INVENTION

In high-end ICE systems, two processors are generally employed. One processor controls the system and interacts with the user, while the other processor (similar or identical to a device being emulated) runs the user code to emulate the operation of the device being emulated.

In low-cost ICE systems, however, only a single processor may be available to run both the control code as well as the user code. If the processor has a large address space, then both the control code and the user code may concurrently be addressable within its memory address map with minimal impact on the ICE system's target environment (i.e., without unduly limiting the size of the user code or the amount of code for controlling the system and interacting with the user). On the other hand, if the processor has a small address space, then the size of the user code and/or control code may be adversely limited by concurrent inclusion of the control code in the processor's memory address map, thus adversely impacting the ICE system's target environment.

OBJECTS AND SUMMARY OF THE INVENTION

Accordingly, it is one object of the present invention to provide an ICE system including a single processor having a small address space, wherein the ICE system has a minimal adverse impact on its target environment.

A related object is to provide a single processor ICE system that makes all of the memory address space of the target processor available for user code.

Another object is to provide a single processor ICE system which switches between a monitor state where the control code is being executed, and a user state where the user code is being executed, without the addition of signal lines dedicated to initiate such switching.

Still another object is to provide an ICE system which protects against inadvertent overwriting of system variables by the operator or by the user code.

These and additional objects are accomplished by the various aspects of the present invention, wherein briefly stated, one aspect is an ICE system for emulating a target processor. Included in the ICE system are a first read-only-memory area, a second read-write memory area, a processor, and memory map switch logic. The first memory area stores control code (i.e., emulation control software) including a debug monitor. The second memory area is available for storing user code executable on the target processor, and data processed by such code. The processor alternatively runs (i.e., executes) the control code and the user code. When the control code attempts to write to one of several predefined address ranges in the first memory area, the memory map switch logic causes the first memory area to be decoupled from the processor's memory address space and the second memory area to be coupled to the processor's memory address space, for a subsequent one, two, or indefinite number of read or write operations.

In another aspect, an in-circuit emulation system includes a first memory area for storing control code, a second memory area for storing user code executable on a target processor, a single processor alternatively executing the emulation and user codes, and memory map switch logic which causes the first memory area to be coupled to the processor's memory address space and causes the second memory area to be decoupled from the processor's memory address space, when the processor performs an instruction fetch operation to one of a plurality of predefined addresses while the second memory area is coupled to the processor's memory address space.

Additional objects, features and advantages of the various aspects of the present invention will become apparent from the following description of its preferred embodiments, which description should be taken in conjunction with the accompanying drawings.

DETAILED DESCRIPTION OF THE PREFERRED EMBODIMENTS

A single processor in-circuit emulator system embodying the present invention, operates in two distinct states, called "monitor state" and "user state". When operating in the monitor state, the user typically uses and interacts with control code (such as a debug monitor). Therefore, a memory area (such as in an EPROM) containing the control code should be present in the processor's memory address map at this time. To switch to the user state, the user typically inputs a command indicating that the processor should now run the user code. In order to make the entire memory address space of the processor available for the user code and data, the memory area containing the control code is taken out of the processor's memory address map at this time.

Figure 1:
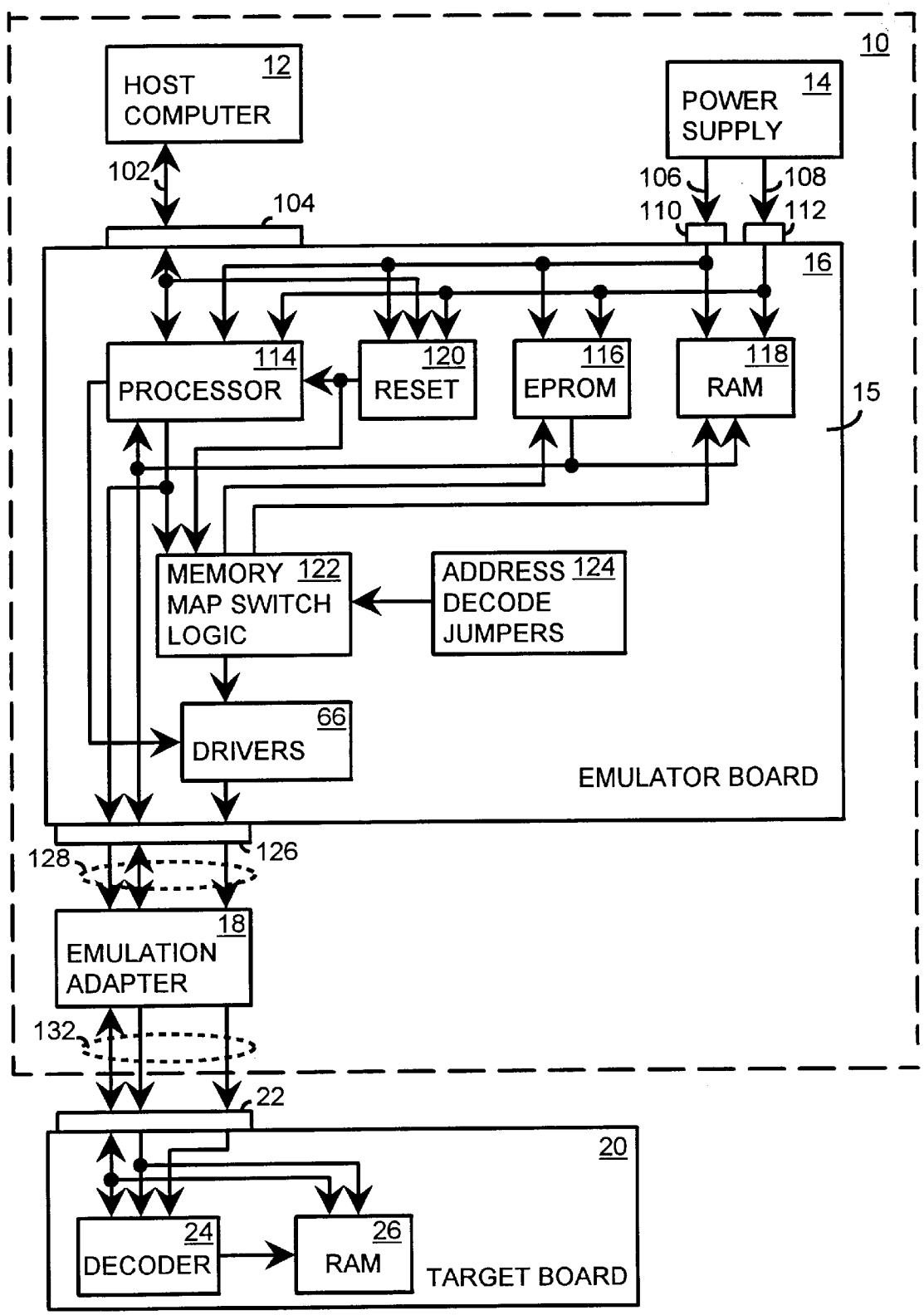
FIG. 1 illustrates a block diagram of a single processor ICE system utilizing aspects of the present invention.

FIG. 1 illustrates a block diagram of a single processor ICE system 10 for emulating a target processor on a user's target board 20. The target board 20 includes an IC socket 22 for receiving the target processor, a decoder device 24, a random-access-memory (RAM) device 26, and other devices (not shown) for performing a particular function of the target board 20. When emulating the target processor, the single processor ICE system 10 is connected to the IC socket 22 in place of the target processor.

The single processor ICE system 10 includes a host computer 12, a power supply 14, an emulator board 16, and an emulation adaptor 18. The host computer 12 (such as an IBM personal computer) is connected by a serial cable 102 to a serial input socket 104 on the emulator board 16 to allow user interaction with the emulator board 16 and downloading of user developed software (user code) from the host computer 12 to the emulator board 16. The power supply 14 is connected by power and ground lines 106 and 108 to power and ground connections 110 and 112 of the emulator board 16 to provide power and ground reference voltages to the emulator board 16.

The emulator board 16 includes a printed circuit board 130 upon which are mounted and conventionally coupled together generally as shown, a processor 114, a read-only-memory (EPROM) device 116, one or more random-access-memory (RAM) devices 118, a reset signal generator circuit 120, memory map switch logic 122, and address decode jumpers 124. The read-only-memory device 116 stores the control code, and is preferably an electrically programmable read-only-memory (EPROM). The random-access-memory device 118 may store the downloaded user code as well as user data and data related to the controlling process. The processor 114 alternatively executes the control code and the user code, and is preferably identical to the device being emulated.

The control code is typically called a debug monitor, which the user interacts with through the host computer 12. When the processor 114 is executing the debug monitor, the system is in the monitor state, and when the processor 114 is executing the downloaded user code, the system is in the user state. A portion of the RAM 118, such as the last 256 bytes, forms a restricted memory area accessible to the processor 114 only in the monitor state for storing and accessing the debug monitor's variables and other data. This restricted area is inaccessible to the processor 114 in the user state, so that neither user code nor operator-entered commands can inadvertently overwrite the area. The remaining portion of the RAM 118 forms an unrestricted area which is accessible to the processor 114 in both monitor and user states. This unrestricted area can be positioned at various ranges in the addressable memory space of the processor 114 during the user state, by placement of the address decode jumpers 124.

In the architecture of many processors, certain low-addressed locations have special significance. In the case of the Zilog Z8180™, for example, the processor begins execution at address 0000 (hex) when a reset signal RESET provided at its reset input is asserted and then negated. Assertion of the reset signal RESET may be done by the reset circuit 120 when power is first applied, or by the system user operating a reset pushbutton or similar means. If another input called a Non-Maskable Interrupt (NMI) is asserted, the Z8180™ processor saves information reflecting its former state, and then begins executing at address 0066 (hex).

A set of eight "Restart" instructions are similar to subroutine calls in the Z8180™ processor, in that when they are executed, the processor saves the address following the instruction, and then begins execution at one of the addresses 0000, 0008, 0010, 0018, 0020, 0028, 0030, or 0038 (hex). The debug monitor uses one of these restart instructions (i.e., RST 28) to implement breakpoints and instruction stepping, and uses another (i.e., RST 20) to offer certain console input/output services to user programs. The other six restart instructions (i.e., RST 00, RST 08, RST 10, RST 18, RST 30, and RST 38) can be freely used by user programs, for any purpose.

The ICE system 10 does not necessarily require the target board 20 for initial debugging and development of the user code, since the emulator board's RAM 118 may well be sufficient for such purposes, and can be assigned to any of several areas in the addressable memory space of the processor 114. In such case, the user code and data are stored in the emulator board's RAM 118. In subsequent debugging and development, however, the target board's RAM 26 typically stores the user code, and the emulator board's RAM 118 stores data.

The memory map switch logic 122 maps addresses in the address space of the processor 114 to corresponding addresses of the system memory devices 116, 118 and 26. In its monitor state configuration, the memory map switch logic 122 maps the first 32K addresses (0000–7FFF hex) of the processor's memory address space to corresponding addresses of the emulator board's EPROM 116, and the next 32K addresses (8000-FFFF hex) of the processor's memory address space to corresponding addresses of the emulator board's RAM 118. The remaining addresses of the processor's memory address space are ignored in the monitor state. On the other hand, in its user state configuration, the memory map switch logic 122 maps up to the entirety of the processor's memory address space to corresponding addresses of the emulator board's RAM 118 (excluding the last 256 bytes as previously explained) and the target board's RAM 26. In this case, the memory map switch logic 122 does not include the emulator board's EPROM 116, and address mapping to the emulator and target boards' RAMs, 118 and 26, depends upon where the restricted portion of the emulator board's RAM 118 is positioned in the addressable memory space of the processor 114.

The memory map switch logic 122 also automatically switches between monitor state and user state configurations in response to either a system or user initiated reset signal, a user initiated interrupt signal, or certain other prespecified actions taken by the processor 114. It performs such function by receiving certain inputs including an address from the processor 114, and in response thereto, causing the chip select line of the appropriate system memory device 116, 118 or 26 to be activated (enabled). In particular, the memory map switch logic 122 directly activates chip select lines ROMCS and RAMCS respectively provided to the emulator board's EPROM device 116 and RAM device 118, and causes activation of signal line ENMREQ, which in turn, allows propagation of a signal MREQ generated by the processor 114, that signals or expresses memory access cycles, to pass to the target board 20.

For convenience, the memory map switch logic 122 is referred to as being in the monitor state when it places the memory address map of the processor 114 in the monitor state configuration, and conversely, is referred to as being in the user state when it places the memory address map of the processor 114 in the user state configuration.

When the reset signal RESET is asserted, the memory map switch logic 122 places the memory address map of the processor 114 in the monitor state configuration, thereby allowing the debug monitor software to access the emulator board's EPROM 116 and RAM 118, as described above. The reset signal RESET may be asserted by the reset circuit 120 at power up (or restart) automatically by the system, or in response to the user pressing a reset button or other reset device.

The memory map switch logic 122 recognizes certain operations performed by the debug monitor in the monitor state, which allow the debug monitor to access the target board's RAM 26 and cause the memory map switch logic 122 to enter the user state, either temporarily or long-term. These operations consist of writing to the part of the memory address space allocated to the EPROM 116, which would not normally be done by the debug monitor software since such write operations accomplish nothing (other than affecting the logic of the memory map switch logic 122).

In the user state, the memory map switch logic 122 disables access to the emulator board's EPROM 116 and to the last 256 bytes of the emulator board's RAM 118, while enabling access to the unrestricted portion of the emulator board's RAM 118 and the target board's RAM 26 (if any).

While in the user state, the memory map switch logic 122 monitors the processor's address and control signal outputs so as to detect an "instruction fetch" access to any of the addresses 0000, 0020, 0028, or 0066 (hex), any of which cause the memory map switch logic 122 to switch immediately back to the monitor state, so that such access reads from the emulator board's EPROM 116, as do subsequent accesses to successively higher addresses.

The emulation adaptor 18 is a mechanical artifice to couple electrical connections of a connector 126 of the emulator board 16 to corresponding connections of the target board's IC socket 22. In particular, in the preferred embodiment, the emulation adaptor 18 comprises a 68 pin PLCC having a tower 128 attached at one end for coupling to the emulator board's connector 126, and pins 132 at another end for insertion into the target board's IC socket 22.

Figure 2:
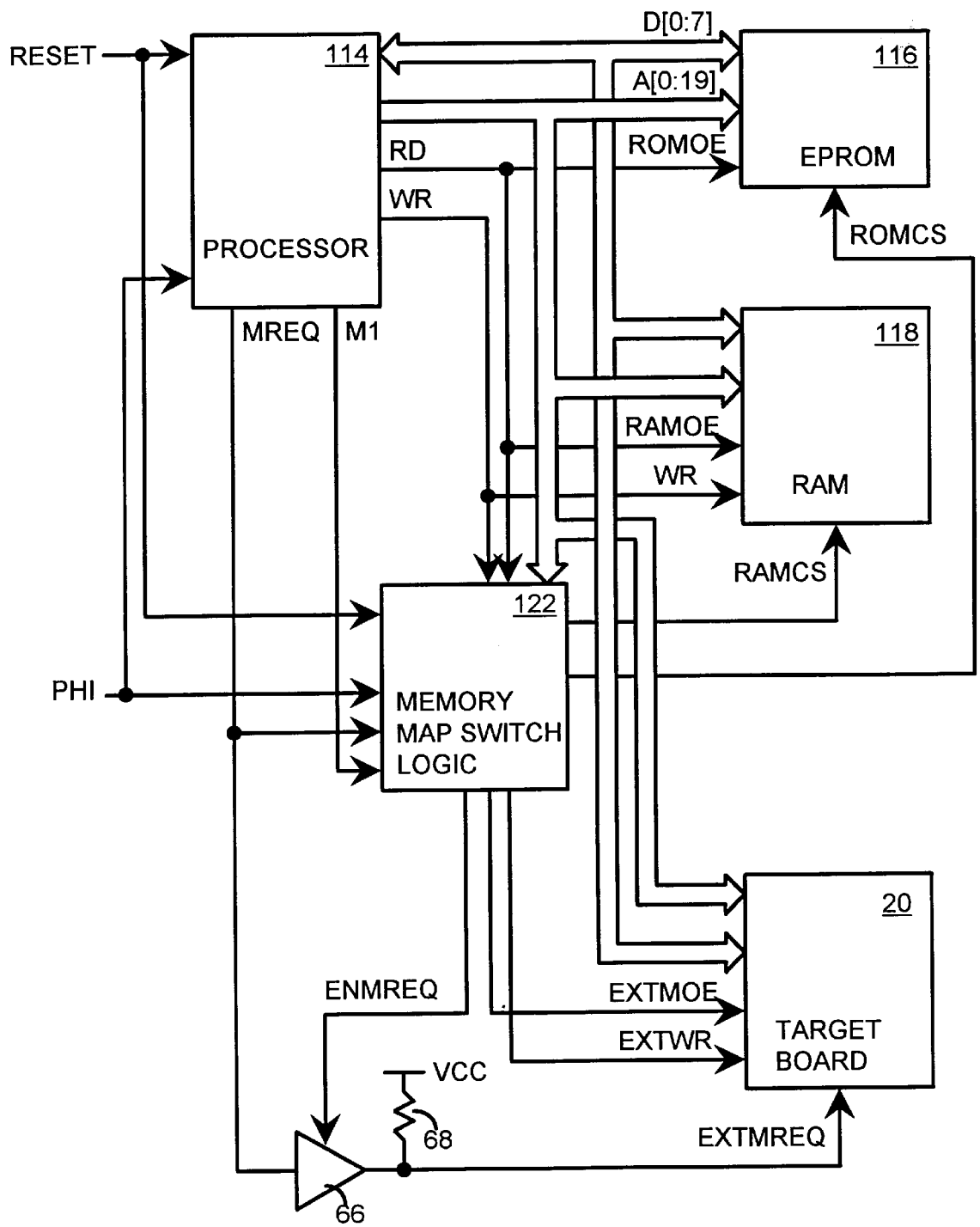
FIG. 2 illustrates a block diagram detailing connections between the memory map switch logic of FIG. 1 and other parts of the ICE system of FIG. 1, utilizing aspects of the present invention.
Figure 3A:
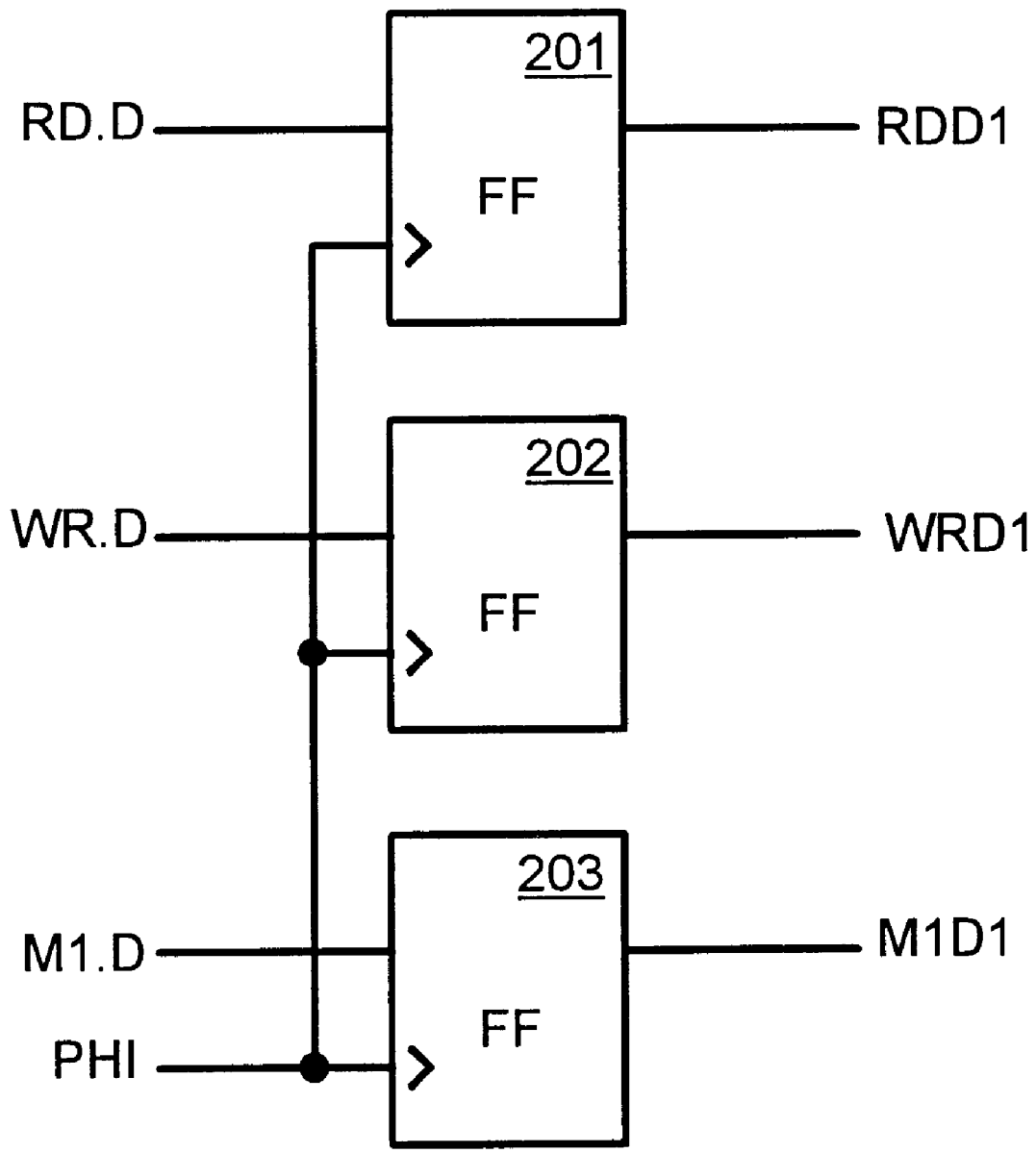
FIGS. 3a–j illustrate logic diagrams implementing the memory map switch logic of FIG. 2, utilizing aspects of the present invention.
Figure 3B:
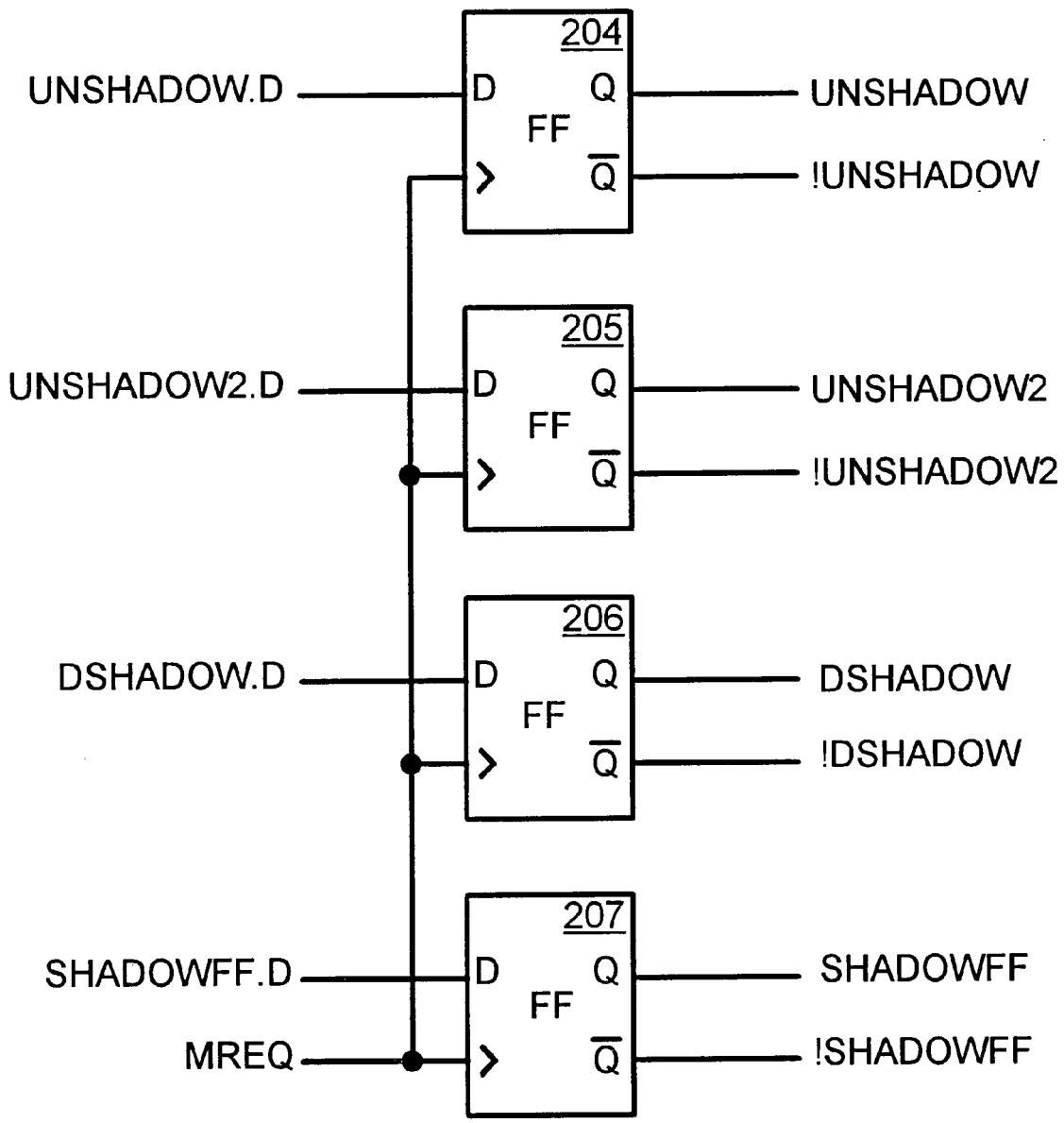
Figure 3C:
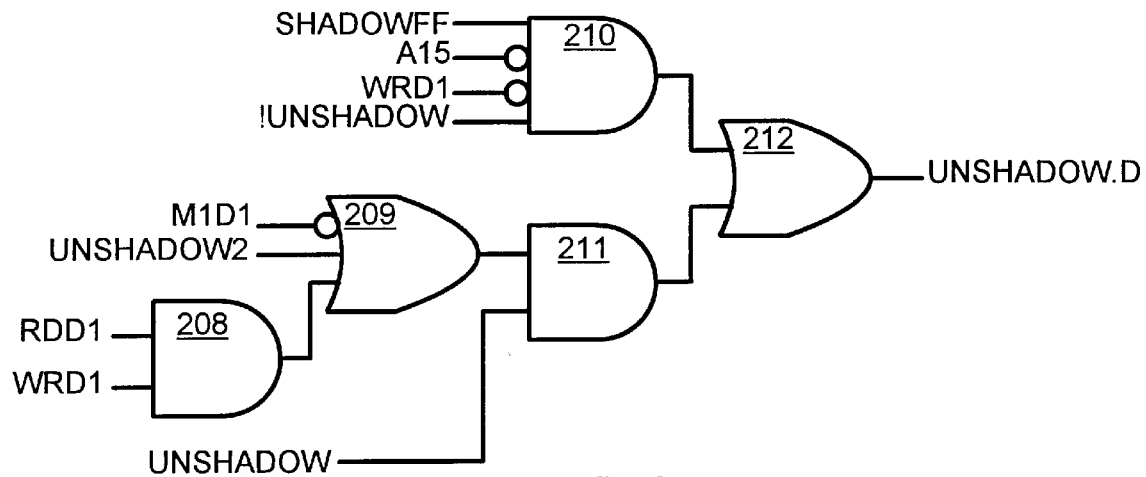
Figure 3D:
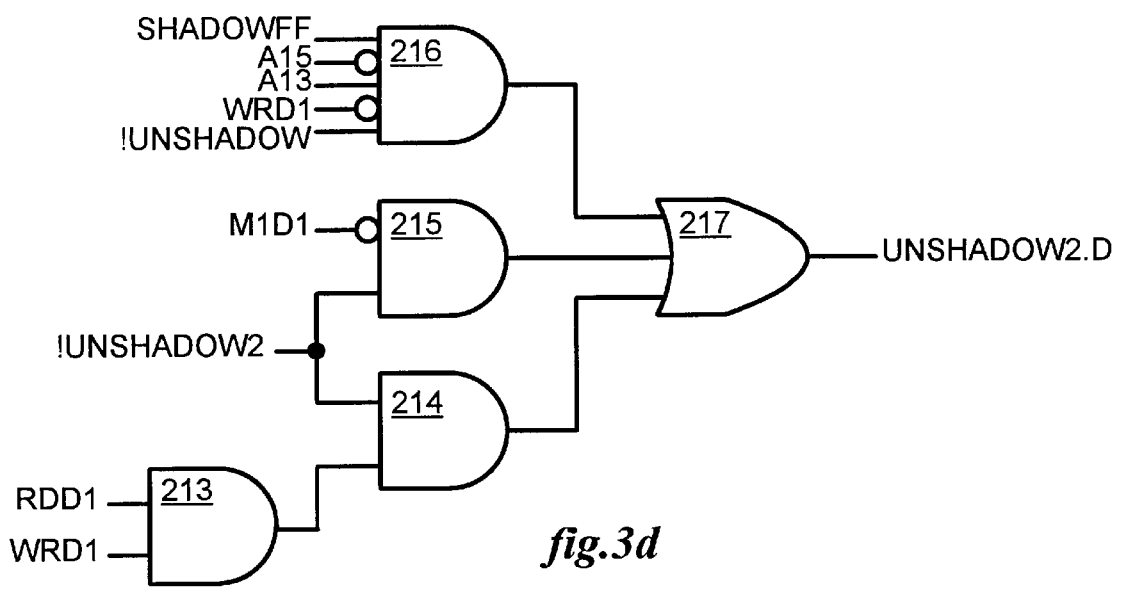
Figure 3E:
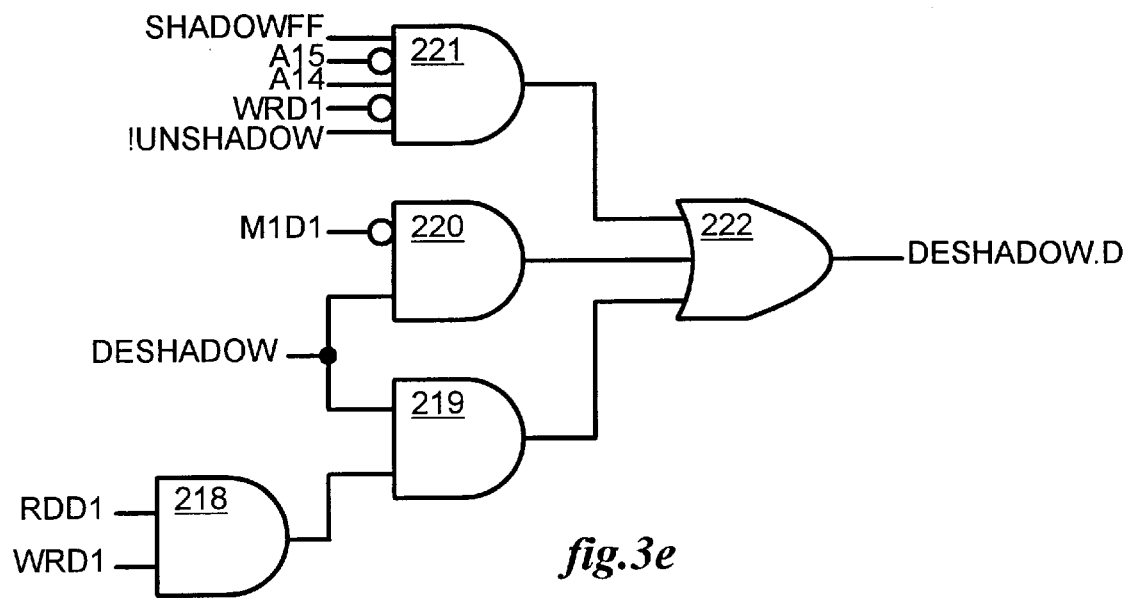
Figure 3F:
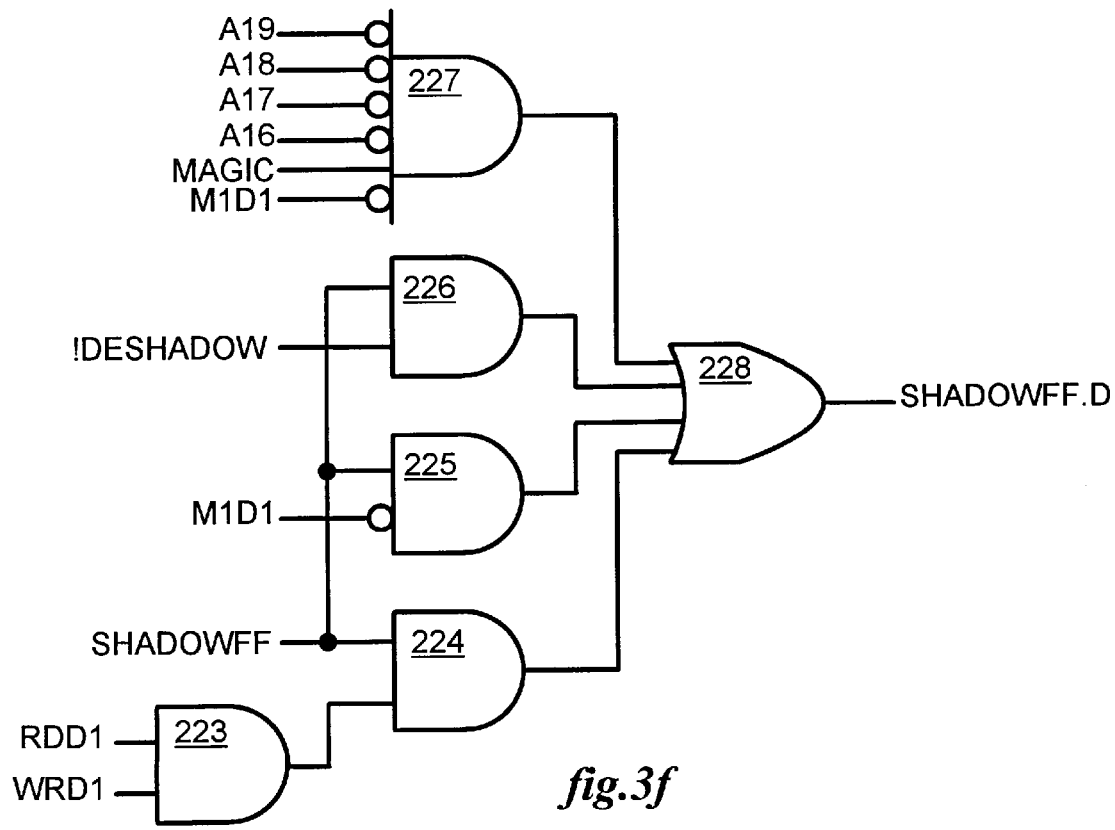
Figure 3G:
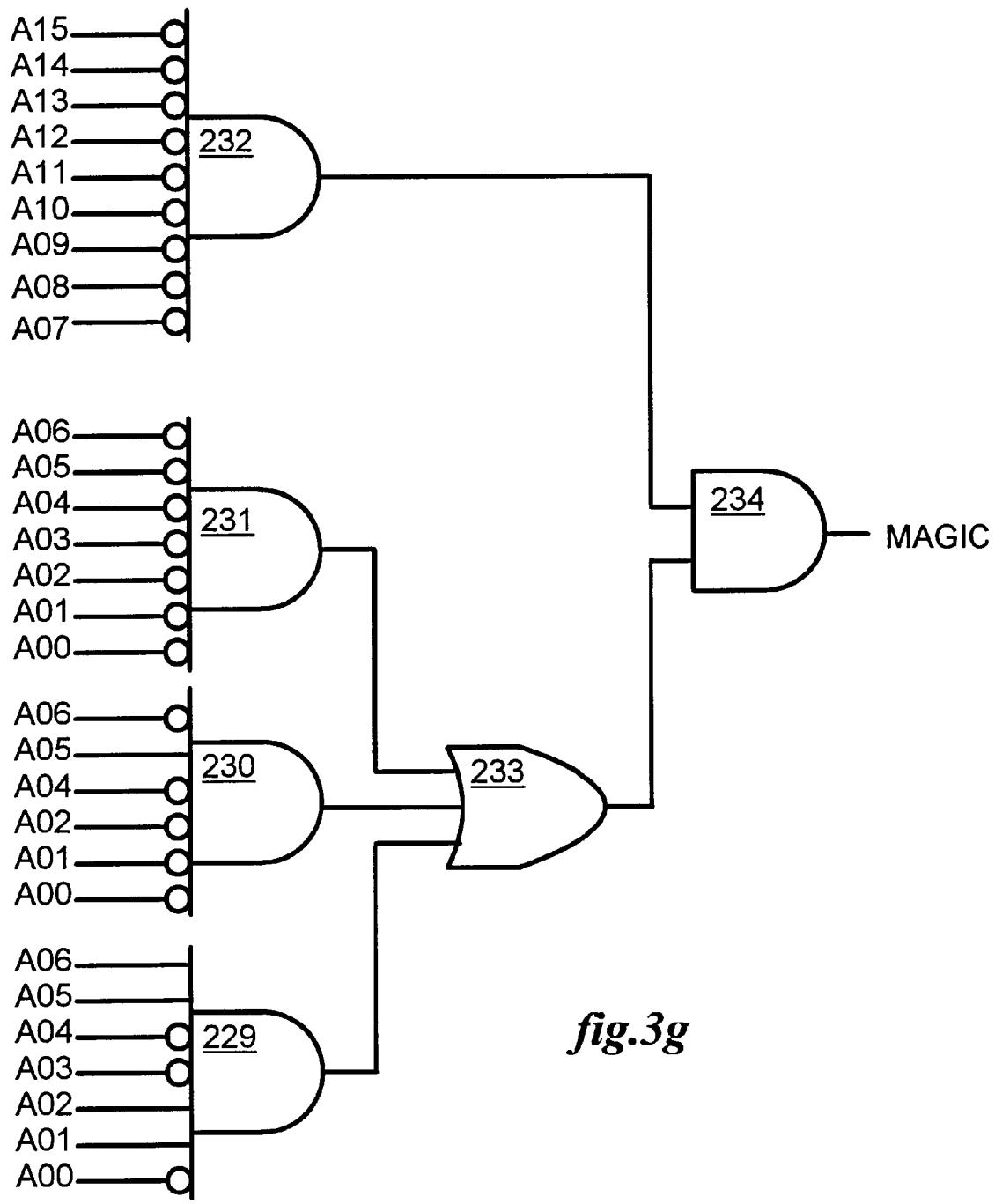
Figure 3H:
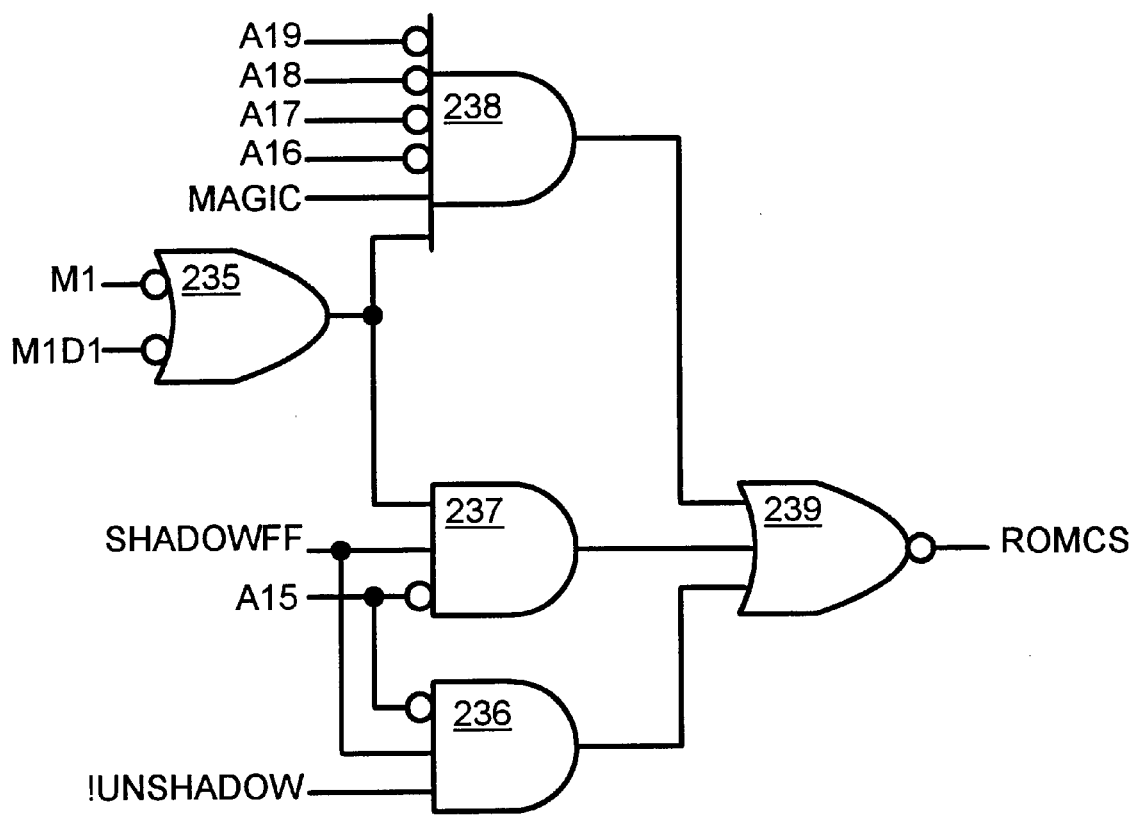
Figure 3I:
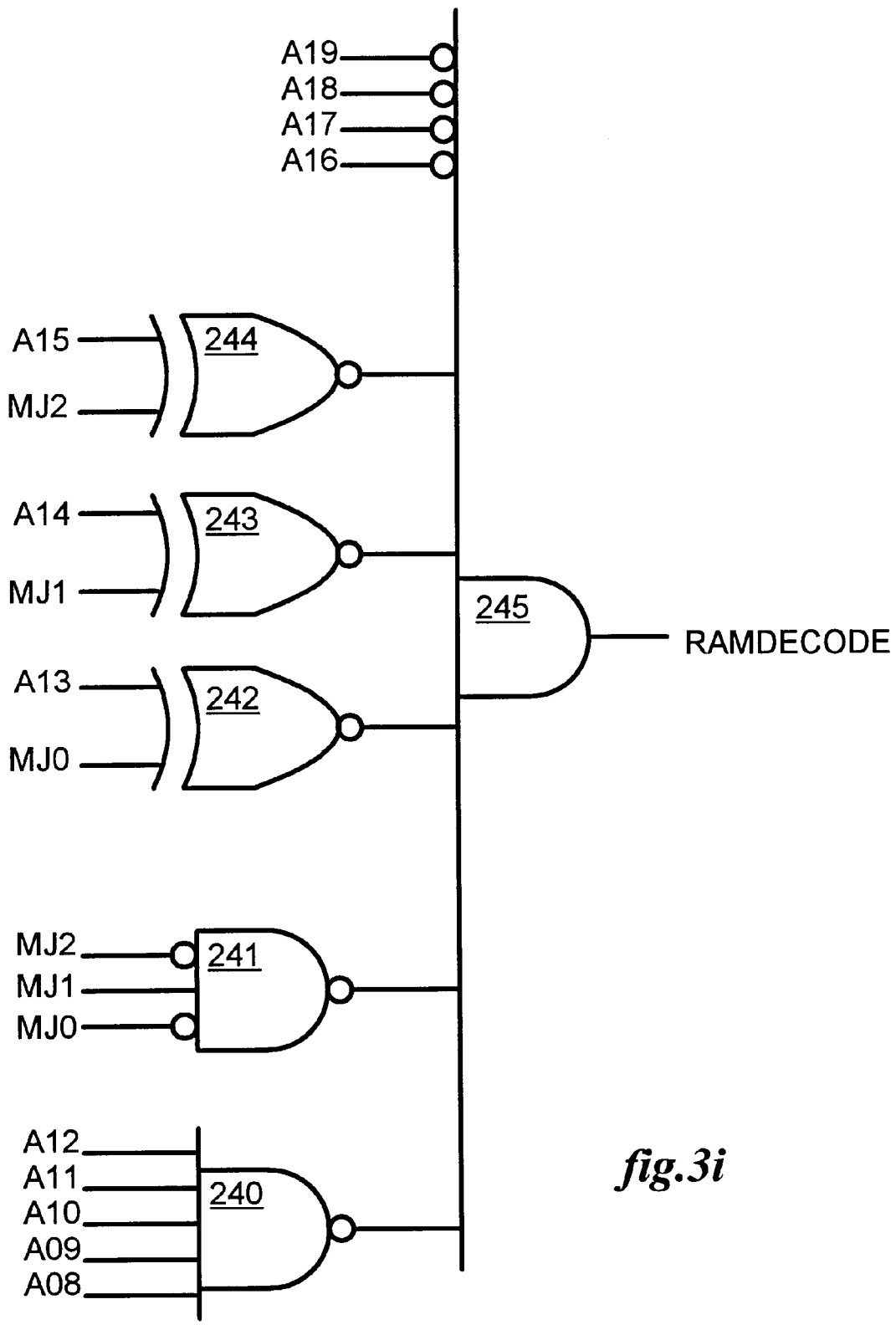
Figure 3J:
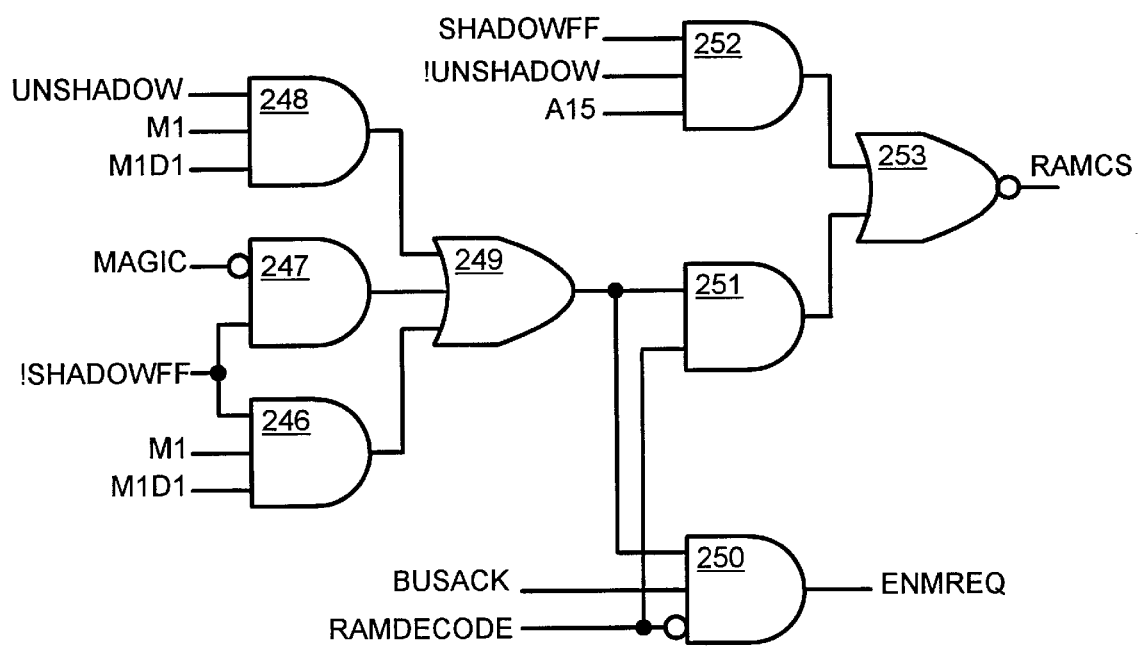

FIG. 2 illustrates a block diagram detailing connections between the processor 114, the emulator board's memories 116 and 118, the memory map switch logic 122, and the target board 20. A data bus D[7:0], memory read and write lines, RD and WR, and part of an address bus A[19:0], are directly coupled in a conventional manner from the processor 114 to the emulator board's EPROM 116 and RAM 118. Although the address bus A[19:0] and data bus D[7:0] are also directly coupled to the target board's RAM 26 through the connector 126 and the emulation adaptor 18, the memory read and write lines, RD and WR, and/or memory request line MREQ, are preferably coupled to the target board's RAM 26 through the memory map switch logic 122, as well as through the connector 126 and the emulation adaptor 18. When performing an instruction fetch from one of the system memories 116, 118 or 26, the processor 114 provides a byte address on the address bus A[19:0] and asserts its memory read enable line RD, its memory request line MREQ, and its instruction read line M1. The processor 114 then reads the fetched instruction byte on the data bus D[7:0]. The memory device from which the instruction was fetched is transparent to the processor 114. The memory map switch logic 122 causes the appropriate memory device's chip select line to be asserted, so as to allow retrieval of the instruction from that device, according to the processor's then-current memory address map. Similarly, when performing a data read or write operation with one of the system memories 116, 118 and 26, the processor 114 provides a byte address on the address bus A[19:0], provides or reads a byte of data on the data bus D[7:0] (depending upon whether it is performing a read or write operation), asserts its memory request line MREQ and its memory read enable line RD or memory write enable line WR (depending upon whether it is performing a read or write operation), but does not assert its instruction read line M1. Again, the memory device from which data is being read from or written to is transparent to the processor 114. The memory map switch logic 122 again causes the appropriate memory device's chip select line to be asserted so as to allow reading and writing of data from or to that device, according to the processor's then-current memory address map.

Assertions of the chip select line ROMCS of the emulator board's EPROM 116 and the chip select line RAMCS of the emulator board's RAM 118 are performed by the memory map switch logic 122. Assertion of a chip select line EXRAMCS of the target board's RAM 26 is performed by the memory map switch logic 122 enabling a driver 66 by asserting its enable line ENMREQ, thereby allowing the memory request signal MREQ to pass to the target board's decoder 24 through driver 66. Similar drivers may also be employed for selectively passing the memory read and write, RD and WR, signals to the target board 20.

Additional connections include a reset line providing the reset signal RESET from the reset circuit 120 to the processor 114 and the memory map switch logic 122, and a clock line providing a clock signal PHI to the processor 114 and the memory map switch logic 122 from a crystal oscillator (not shown). Although the reset circuit 120 is depicted for convenience as being on the emulator board 16, in practice it may also be residing in other parts of the ICE system 10, such as in the host computer 12 or target board 20. The clock signal PHI is generated in a conventional fashion on the emulation board 16 and provided to the memory map switch logic 122.

The memory map switch logic 122 comprises a programmable logic device (EPLD), which is programmed as a state machine according to the following logic as written in high-level design logic code for programmable logic devices marketed by Altera Corporation.

```
TITLE "Zilog Z8180 Student Kit Glue";
SUBDESIGN skit (a[19..0], mj[2..0], phi, m1, wr, mreq,
reset, busack, rd : INPUT; romcs, ramcs, enmreq :
OUTPUT;)
VARIABLE magic, ramdecode : NODE;
       shadowFF, m1d1, wrd1, unshadow, unshadow2,
deshadow,
       rdd1 : DFF;
BEGIN
   % delayed signals %
   rdd1.d = rd;     rdd1.clk = phi;
   wrd1.d = wr;     wrd1.clk = phi;
   m1d1.d = m1;     m1d1.clk = phi;
   % writing to 1st quarter of ROM area (x0xxx-
x1xxx) sets next      non-M1 cycle non-shadowed %
   % writing to 2nd quarter of ROM area (x2xxx-
x3xxx) sets next 2     non-M1s non-shadowed %
   % writing to 3rd quarter of ROM area (x4xxx-
x5xxx) stops          shadowing at next non-M1 %
   unshadow.d     = shadowFF & !a15 & !unshadow &
!wrd1
       # unshadow & !m1d1
              # unshadow & rdd1 & wrd1
          # unshadow & unshadow2;
   unshadow.clk   = global(mreq);
   unshadow.clrn  = reset
   % shadowing state is set by any of 3 magic
accesses %
   magic = a[15..7]==0
       & ( a[6..0]==0
          # !a6 & a5 & !a4 & !a2 & !a1 & !a0   % RST
20H or 28H %
          # a[6..0]==H"66");
   % writing to ROM area in (x4000-x5FFF) ends
shadowing at next       non-M1 cycle %
      dshadow.d     = shadowFF & !a15 & a14 &
!unshadow & !wrd1
         # deshadow & rdd1 & wrd1
              # deshadow & !m1d1;
   deshadow.clk   = global(mreq);
   deshadow.clrn  = reset;
   % the shadowing state %
   shadowFF.d     = a[19..16]==0 & magic & 1m1d1
                       # shadow FF & !deshadow
                   #shadowFF & rdd1 & wrd1
                           # shadowFF & !m1d1;
   shadowFF.clk   = global(mreq);
   shadowFF.prn   = reset;
   % ROM is selected when shadowing, a15=0, and not
a non-M1   cycle after a write to ROM %
   romcs = !(a[19..16]==0 & magic & !m1
       # a[19..16]==0 & magic & !m1d1
       # shadowFF & !m1           & !a15
       # shadowFF & !m1d1         & !a15
       # shadowFF & !unshadow     & !a15;
   % when shadowing and not after a write to first
half of ROM,       RAM is selected when A15=1.
   when not shadowing or in the first non-M1 cycle
```

-continued

```
after a write      to a first half of ROM, RAM is
                   selected if A19-16 are 0, A15-13
                   match mj jumpers which are not
                   010, and not the last 256 bytes of
                   the RAM %
    ramdecode = a[19..16]==0 & a[15..13]==mj[] &
mj[]!=H"2"
                   & a[12..8]!=H"1F";
    ramcs = !(shadowFF & !unshadow & a15
            # (ramdecode & ( unshadow & m1 & m1d1
                       # !shadowFF & !magic
                            # !shadowFF & m1 &
m1d1)));
    % we propagate the mreq from the CPU to the
emulation header    when bus is not granted, and
                    not RAM select, and we're not
                    shadowing %
    enmreq = busack& !ramdecode
           & (!shadowFF & !magic
                # !shadowFF & m1 & m1d1
                # unshadow & m1 & m1d1;
END;
```

The logic of the state machine defines five states: the monitor state, two escape accesses to user state pending, one escape access to user state pending, user state pending, and the user state. As previously described, the processor 114 can access the control code stored in the emulator board's EPROM 116 during the monitor state, and the user code stored in the emulator board's RAM 118 and target board's RAM 26 during the user state. The "two and one escape accesses to user space pending" states allow reading and writing of data not normally accessible in the monitor state, by escaping to the user state for the next two or one data cycles before returning to the monitor state. When a signal on the memory request line MREQ rises at the end of such a cycle, the logic proceeds from the two escape pending state to the one escape pending state, or from the one escape pending state back to the monitor state, as appropriate. The "two cycles" facility is provided, for example, to make accesses to stacked data and other 16-bit data more convenient, as well as to allow "string instructions" in the debug monitor to operate in user memory space. The user state pending indicates that the memory map switch logic 122 is to switch to the user state starting with the next data cycle. This data cycle reads the first byte of the user's starting address from the stack. The memory map switch logic 122 then enters user state in this case, on the rising/trailing edge of a signal on the memory request line MREQ.

In the state machine logic above, four flip-flops called unshadow, unshadow2, deshadow, and shadowFF embody the five states as follows: the state machine logic decodes as in monitor state when the outputs of flip-flops unshadow, unshadow2 and deshadow are false (logic LOW), and the output of flip-flop shadowFF is true (logic HIGH); the state machine logic decodes as in the "two escape accesses pending" state when the outputs of flip-flops unshadow, unshadow2 and shadowFF are true (logic HIGH), and the output of flip-flop deshadow is false (logic LOW); the state machine logic decodes as in the "one escape access pending" state when the outputs of flip-flops unshadow and shadowFF are true (logic HIGH), and the outputs of flip-flops unshadow2 and deshadow are false (logic LOW); the state machine logic decodes as in the "user state pending" state when the outputs of flip-flops unshadow, deshadow and shadowFF are true (logic HIGH), and the output of flip-flop unshadow2 is false (logic LOW); and the state machine logic decodes as in the user state when the outputs of all flip-flops unshadow, unshadow2, deshadow, and shadowFF are false (logic LOW). All four flip-flops unshadow, unshadow2, deshadow, and shadowFF are clocked by the trailing/rising edge of a signal on the memory request line MREQ.

In the monitor state, the memory map switch logic 122 asserts the chip select line ROMCS of the emulator board's EPROM 116 when the address bit A15 is logic LOW, asserts the chip select line RAMCS of the emulator board's RAM 118 when the address bit A15 is logic HIGH, and never asserts the enable line ENMREQ which would cause the memory request signal MREQ to be passed to the target board's decoder 24. This means that the first 32K bytes of the basic 65K byte memory address space of the processor 114, i.e., addresses 0000-7FFF (hex), are decoded as the emulator board's EPROM 116, and the upper 32K bytes of memory address space, i.e., addresses 8000-FFFF (hex), are decoded as the emulator board's RAM 118. Address outputs A19–A16, which extend memory space from 65K to 1 Megabyte, are not decoded in the monitor state.

While in the monitor state, the memory map switch logic will enter one of the three transitional states if it detects a memory write with A15 low, namely a write to the addressable memory space allocated to the emulator board's EPROM 116. In particular, if the memory map switch logic 122 detects a write to the memory address range of 0000-1FFF (hex), i.e., A15 LOW, A14 LOW, and A13 LOW, then the next state it decodes in is the "one escape pending" state; if the memory map switch logic 122 detects a write to the memory address range of 2000-3FFF (hex), i.e., A15 LOW, A14 LOW, and A13 HIGH, then the next state it decodes in is the "two escape pending" state; and if the memory map switch logic 122 detects a write to the memory address range of 4000-7FFF (hex), i.e., A15 LOW, A14 HIGH, and A13 X (don't care), then the next state it decodes in is the "user pending" state.

In the user state, the memory map switch logic 122 asserts the chip select line ROMCS of the emulator board's EPROM 116 (i.e., switches to monitor state) only if the processor 114 performs an instruction fetch to one of the addresses 00000, 00020, 00028, or 00066 (hex) by asserting the instruction read line M1 (i.e., driving it logic LOW) and providing one of the addresses 00000, 00020, 00028, or 00066 (hex) on address lines A19-0 of the address bus A[19:0]. The memory map switch logic 122 asserts the chip select line RAMCS of the emulator board's RAM 118 if it is not asserting the chip select line ROMCS of the emulator board's EPROM 116, the emulator board's RAM 118 is enabled in the user state, the logic states on address lines A19-16 are all LOW, the logic states on address lines A15-13 match those indicated by the decoding jumpers, and the logic states on address lines A12-8 are not all LOW. The memory map switch logic 122 asserts the enable line ENMREQ only if it is not asserting either of the chip select lines, ROMCS and RAMCS, for the emulator board's EPROM 116 and RAM 118. In the user state, the memory map switch logic 122 enters the monitor state at the rising/trailing edge of a signal on the memory request line MREQ at the end of a memory cycle in which it has asserted the chip select line ROMCS for the emulator board's EPROM 116.

FIGS. 3*a*-3*j* illustrate an alternative embodiment of the memory map switch logic 18, wherein the above logic is implemented by conventional logic circuitry including flip-flops, rddl, wrdl, mldl, unshadow, unshadow2, deshadow, and shadowFF with data input logic as detailed above wherein the term "&" denotes a logic AND function, the term "!" denotes an inverter function, and the term "#" denotes a logic OR function.

Although the various aspects of the present invention have been described with respect to a preferred embodiment, it will be understood that the invention is entitled to full protection within the full scope of the appended claims.

What is claimed is:

1. An in-circuit emulation system for emulating a target processor, comprising:

a first read-only-memory area for storing control code, wherein said first read-only-memory area resides in a read-only-memory device enabled by activation of a first chip select line, a second memory area for storing user code executable on said target processor, wherein said second memory area resides in a random-access-memory device enabled by activation of a second chip select line, a processor coupled to said first read-only-memory area and said second memory area, and memory map switch logic coupled to said first read-only-memory area, said second memory area, and said processor, said memory map switch logic (1) causing said first read-only-memory area to be decoupled from a memory address space of said processor and causing said second memory area to be coupled to said memory address space of said processor, when said processor attempts to write to predefined addresses of said first read-only-memory area, (2) dynamically alters a memory address map of said processor such that said memory address map includes said first read-only-memory area when said processor is executing said control code and does not include said first read-only-memory area when said processor is executing said user code, (3) causes said first chip select line to be activated when said processor is fetching said control code, and causes said first chip select line to never be activated when said processor is executing said user code, (4) causes said second chip select line to be activated when said processor is fetching user code stored in said second memory area, or reading or writing data from or to said second memory area, (5) configures said memory address map to a monitor state configuration, allowing said processor access to said read-only-memory and said random-access-memory devices, when said processor is executing said control code, (6) configures said memory address map to a user state configuration, allowing said processor access to an unrestricted portion of said random-access-memory device, and not allowing said processor access to said read-only-memory device and a restricted portion of said random-access-memory device, when said processor is executing said user code, and (7) configures said memory address map to said user state configuration for the next data cycle, when said processor attempts to write to an address in a first address range allocated to said read-only-memory device while said memory address map is in said monitor state configuration, and reconfigures said memory address map back to said monitor state configuration after said next data cycle.

2. An in-circuit emulation system for emulating a target processor, comprising:

a first read-only-memory area for storing control code, wherein said first read-only-memory area resides in a read-only-memory device enabled by activation of a first chip select line, second memory area for storing user code executable on said target processor, wherein said second memory area resides in a random-access-memory device enabled by activation of a second chip select line, a processor coupled to said first read-only-memory area and said second memory area, and memory map switch logic coupled to said first read-only-memory area, said second memory area, and said processor, said memory map switch logic (1) causing said first read-only-memory area to be decoupled from a memory address space of said processor and causing said second memory area to be coupled to said memory address space of said processor, when said processor attempts to write to predefined addresses of said first read-only-memory area, (2) dynamically alters a memory address map of said processor such that said memory address map includes said first read-only-memory area when said processor is executing said control code and does not include said first read-only-memory area when said processor is executing said user code, (3) causes said first chip select line to be activated when said processor is fetching said control code, and causes said first chip select line to never be activated when said processor is executing said user code, (4) causes said second chip select line to be activated when said processor is fetching user code stored in said second memory area, or reading or writing data from or to said second memory area, (5) configures said memory address map to a monitor state configuration, allowing said processor access to said read-only-memory and said random-access-memory devices, when said processor is executing said control code, (6) configures said memory address map to a user state configuration, allowing said processor access to an unrestricted portion of said random-access-memory device, and not allowing said processor access to said read-only-memory device and a restricted portion of said random-access-memory device, when said processor is executing said user code, and (7) configures said memory address map to said user state configuration for the next two data cycles, when said processor attempts to write to an address in a second address range allocated to said read-only-memory device while said memory address map is in said monitor state configuration, and reconfigures said memory address map back to said monitor state configuration after said next two data cycles.

3. The in-circuit emulation system as recited in either one of claims 1 or 2, said in-circuit emulation system adapted to couple to a socket for receiving said target processor on a target board, said target board including a third memory area for storing user code executable on said target processor, wherein said memory map switch logic blocks processor control signals generated by said processor, which signal or express memory access cycles, from passing to said target board socket when said first or said second chip select line is activated.

4. An in-circuit emulation system for emulating a target processor, comprising:

a first memory area for storing control code, wherein said first memory area resides in a read-only-memory device enabled by activation of a first chip select line, a second memory area for storing user code executable on said target processor, a processor coupled to said first memory area and said second memory area, wherein said second memory area resides in a random-access-memory device enabled by activation of a second chip select line, and memory map switch logic coupled to said first memory area, said second memory area, and said processor, said memory map switch logic (1) causing said first memory area to be coupled to a memory address space of said processor and causing said second memory area to be decoupled from said memory address space of said processor, when said processor performs an instruction fetch operation from one of a plurality of predefined addresses while said second memory area is coupled to said memory address space of said processor, (2) logic dynamically alters a memory address map of said processor, such that said memory address map includes said first memory area when said processor is executing said control code and does not include said first memory area when said processor is executing said user code, (3) causes said first chip select line to be activated when said processor is fetching said control code, and causes said first chip select line to never be activated when said processor is executing said user code, (4) causes said second chip select line to be activated when said processor is fetching user code stored in said random-access-memory device, or reading or writing data from or to said random-access-memory device, (5) alters said memory address map to a monitor state configuration, allowing said processor access to said read-only-memory and said random-access devices, when said processor is executing said control code, (6) alters said memory address map to a user state configuration, allowing said processor access to an unrestricted portion of said random-access-memory device, and not allowing said processor access to said read-only-memory device and a restricted portion of said random-access-memory device, when said processor is executing said user code, (7) configures said memory address map to said user state configuration for the next data cycle, when said processor attempts to write to an address in a first address range allocated to said read-only-memory device while said memory address map is in said monitor state configuration, and reconfigures said memory address map back to said monitor state configuration after said next data cycle.

5. An in-circuit emulation system for emulating a target processor, comprising:

a first memory area for storing control code, wherein said first memory area resides in a read-only-memory device enabled by activation of a first chip select line, a second memory area for storing user code executable on said target processor, a processor coupled to said first memory area and said second memory area, wherein said second memory area resides in a random-access-memory device enabled by activation of a second chip select line, and memory map switch logic coupled to said first memory area, said second memory area, and said processor, said memory map switch logic (1) causing said first memory area to be coupled to a memory address space of said processor and causing said second memory area to be decoupled from said memory address space of said processor, when said processor performs an instruction fetch operation from one of a plurality of predefined addresses while said second memory area is coupled to said memory address space of said processor, (2) logic dynamically alters a memory address map of said processor, such that said memory address map includes said first memory area when said processor is executing said control code and does not include said first memory area when said processor is executing said user code, (3) causes said first chip select line to be activated when said processor is fetching said control code, and causes said first chip select line to never be activated when said processor is executing said user code, (4) causes said second chip select line to be activated when said processor is fetching user code stored in said random-access-memory device, or reading or writing data from or to said random-access-memory device, (5) alters said memory address map to a monitor state configuration, allowing said processor access to said read-only-memory and said random-access-memory devices, when said processor is executing said control code, (6) alters said memory address map to a user state configuration, allowing said processor access to an unrestricted portion of said random-access-memory device, and not allowing said processor access to said read-only-memory device and a restricted portion of said random-access-memory device, when said processor is executing said user code, (7) configures said memory address map to said user state configuration for the next two data cycles, when said processor attempts to write to an address in a second address range allocated to said read-only-memory device while said memory address map is in said monitor state configuration, and reconfigures said memory address map back to said monitor state configuration after said next two data cycles.

6. The in-circuit emulation system as recited in either one of claims 4 or 5, said in-circuit emulation system adapted to couple to a socket for receiving said target processor on a target board, said target board including a third memory area for storing user code executable on said target processor, wherein said memory map switch logic blocks processor control signals generated by said processor, which signal or express memory access cycles, from passing to said target board socket when said first or said second chip select line is activated.

* * * * *